United States Patent [19]

Stillwell et al.

[11] 4,315,284

[45] Feb. 9, 1982

[54] THERMAL SCANNING DEVICES

[75] Inventors: Peter F. T. C. Stillwell, Aldershot; William T. Moore, London; David G. A. Demaine, Leeds, all of England

[73] Assignee: The Rank Organisation Limited, London, England

[21] Appl. No.: 170,177

[22] Filed: Jul. 18, 1980

[30] Foreign Application Priority Data

Jul. 20, 1979 [GB] United Kingdom ............... 25362/79

[51] Int. Cl.$^3$ .............................................. H04N 5/30
[52] U.S. Cl. .................................... 358/209; 358/212; 358/213; 358/160
[58] Field of Search ................. 358/209, 212, 213, 160

[56] References Cited

U.S. PATENT DOCUMENTS 3,800,078 3/1974 Cochran et al. ..................... 358/213
3,800,079 3/1974 McNeil et al. ...................... 358/160
3,830,972 8/1974 Siverling et al. ................... 358/160

Primary Examiner—Richard Murray
Attorney, Agent, or Firm—Brisebois & Kruger

[57] ABSTRACT

An optical scanning device is provided of the kind having optical elements which are rotated and/or oscillated to scan incident light across a detector array. By arranging for successive scans of a plurality of rows of detector elements to overlap, each line of picture information of a scene under surveillance is scanned at least twice during a complete monitoring of the scene, the corresponding detector array output signals being summed to assemble a plurality of summed signals in which there is coherent addition of picture information and incoherent addition of noise. The summed signals are processed into television format for display.

6 Claims, 1 Drawing Figure

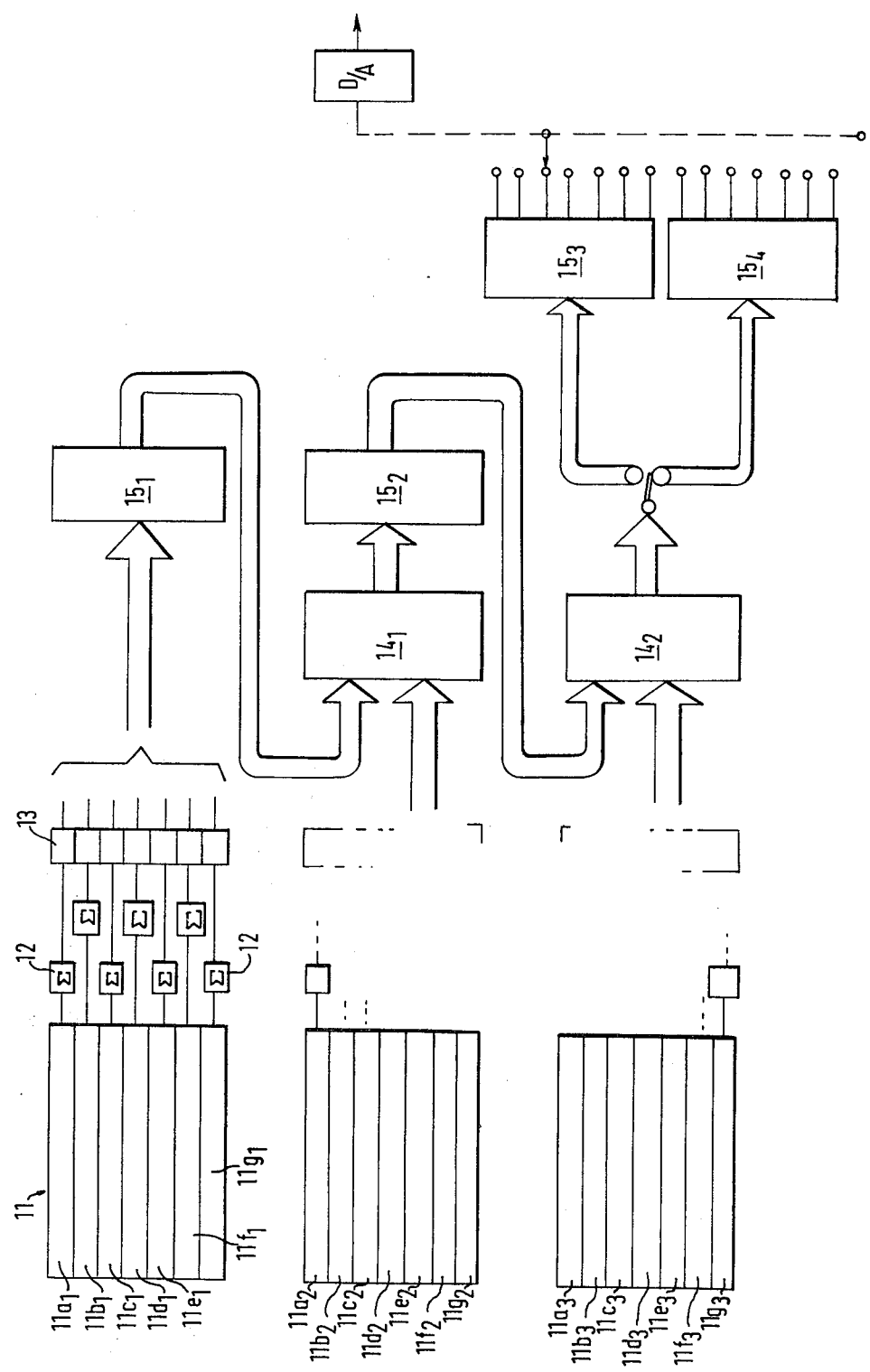

THERMAL SCANNING DEVICES

BACKGROUND OF THE INVENTION

1. Field of the Invention

The present invention relates to an optical scanning device for producing electrical picture-information signals representative of a scene under surveillance. In particular, but not exclusively, the invention relates to such a device adapted for producing images from light in the infra-red region of the spectrum.

When used in this specification the terms "optical" and "light" will be understood to relate to electromagnetic radiation which extends beyond the visible spectrum and includes, inter alia, infra-red radiation.

2. Description of the Prior Art

Imaging devices incorporating optical scanners are known as such. These devices include a telescope directing incident light onto the facets of a polygonal reflector which is driven to rotate so that reflected light is scanned onto a plane reflector (perhaps after one or more further beam folding reflections at plane or curved reflectors) which is caused to oscillate about a given axis in order to change the elevation of the scanned beam orthogonally with respect to the scanning introduced by the rotating polygon. The light from the oscillating plane reflector is directed onto a detector array comprising a plurality of rows of photosensitive elements which produce electrical output signals representing the light incident thereon.

The displacement of the beam in the optical scanner introduced by the rotating polygonal reflector is termed the azimuth scan and the displacement within the optical scanner caused by the oscillating plane reflector is called the elevation scan. The azimuth scan rate is determined by the speed or rotation of the rotating polygonal reflector and, other things being equal, this speed will be related to the number of detector elements perpendicular to the azimuth scan, encompassed in a scan band. The wider the scan band the slower the polygonal reflector has to rotate. This means that for a given speed of rotation of the polygonal reflector there is an upper limit on the width of the scan bands (it being important in some circumstances to maintain the speed or rotation of the polygonal reflector relatively high) and since there are in practice other constraints which limit the number of detector elements in each row there is therefore an upper limit on the total number of detector elements in the detector array, which imposes a limit on the resolution of the eventual image produced by the imaging device of which the optical scanner forms part.

Although prior art devices employ polygonal reflectors it would be possible alternatively to employ refractors and references hereinafter to "optical elements" will be understood to refer to refractors or reflectors.

The technical problem of the present invention is thus to seek means by which, without having to reduce the speed of rotation of an optical element, such as a polygonal reflector in a scanning optical system of an imaging device, it will nevertheless be possible to increase the number of detector elements in a scan band beyond the limit which has previously been imposed by the constraint mentioned above. The present invention seeks to do this in such a way that the signal-to-noise ratio of the scanner is also improved.

SUMMARY OF THE INVENTION

According to the present invention there is provided an optical scanning device for producing electrical picture-information signals representative of a scene under surveillance, said device comprising:

a detector array having a predetermined number or rows each of at least one detector element and each arranged to produce electrical output signals indicated of light incident thereon, optical means arranged to cause a repeated monitoring of the whole of said scene by repeatedly effecting a number of scans during each of which incident light received from a corresponding band of the surveyed scene is scanned across said detector array, the output signals produced by each said row of the detector array during a said scan representing a respective line of picture information taken from the corresponding band of the surveyed scene, said optical means being so arranged that during each monitoring of the scene successively scanned bands overlap each other in a direction transverse to the direction of scanning by an amount sufficient to cause each said line of picture information to be represented more than once, and signal processing means arranged to receive the said output signals produced by the detector array during each monitoring and to combine together those signals which represent the same line of picture information.

In essence, therefore, the width of a scan band remains unchanged and each successive scan band overlaps a part of the previous scan band and is in turn overlapped by a part of the subsequent scan band, the degree of overlap varying in dependence on the other parameters of the scanner and the requirements of use. For example, a 3 dB improvement in the signal-to-noise ratio can be obtained with a two-fold overlap. With a greater degree of overlap, a greater improvement in the signal-to-noise ratio can be obtained. In general, for a P-fold increase in the number of detector elements in the array, which would involve a P-fold overlap of the scan bands, the signal-to-noise improvement is of the order of $10 \log P$ dB.

It will be appreciated that in known such imaging devices the whole of the detector array is illuminated at one azimuth scan with a part of the surveyed scene, the next azimuth scan illuminating the detector array in one scan is often termed the scanning field.

In one embodiment of the present invention there are provided a plurality of groups of stores for storing signals generated by the detector elements of each row upon each scan, and means for summing the values in corresponding stores of the groups upon successive scans of corresponding rows of detectors. In other words, if there are N rows of detectors, scanned with a P-fold overlap of the scans (N is preferably divisible by P), the scanning field advances by N/P lines each scan. Preferably N+N/P stores are provided, each store holding the picture content of an entire line. These N+N/P stores may be regarded as P+1 groups of stores, each group containing N/P stores. Similarly, the rows of the detector can be regarded as P groups of N/P rows of detectors.

In operation the output signals from P−1 of the detector groups are fed to P−1 of the store groups with a fixed association, the last detector group will alternately feed signals to the Pth and the (P+1)th group of stores in order to facilitate conversion of the parallel input from the detectors to the groups to serial output for TV display as will be more fully described below.

In one scan, a given line of the scene is scanned across one of the rows of detectors. During the next scan, it is scanned across the corresponding row of the next group of detectors. Hence, during each scan, the information being fed to one group of stores is identical (except for noise) to the information already present in the preceding group. Therefore, by extracting the contents of the previous group of stores, and adding them to the signals from the group of detectors before storing in the associated group of stores, one obtains a coherent addition of the picture information, and an incoherent addition of noise, resulting in a signal to noise ratio improvement. This process is simultaneously occurring for each of the groups of detectors.

In other words, each store of a group contains a value dependent on the output signals generated by an associated row of detector elements of a group and the output signals generated by the corresponding row of detector elements in the groups previously scanned with a given line of picture information; that is, each store of the first group will contain the signals generated by respective rows of detector elements of the first group which are the first to be scanned by any given line of picture information, the contents of these stores being transferred into the corresponding stores of the second group during the next scan when that line of picture information is being scanned a second time, so that the second group of stores always contains the outputs from the detector elements of the second group which receive picture information which has been scanned twice. Logic processing means are provided for transferring the accumulated signals in each store of a group to the corresponding store of the next group together with the signals being generated by the detector elements of the row being scanned at that time with the same picture information. The last two groups of stores, that is the Pth and the (P+1)th groups of stores being used alternately, one to receive the accumulated signals from the (P−1)th group of stores and the signals from the row of detectors receiving picture information being scanned the Pth time, and the other containing the total sum which is at this time being fed out to further processing means for conversion, for example, to television signal format.

Preferably, the stores are digital stores and the detectors of each row each have an associated analogue-to-digital converter. In such an embodiment each row of detectors has an associated analogue summing circuit to which the outputs of the detectors are fed, the output of the analogue summing circuit being fed to the analogue-to-digital converter.

BRIEF DESCRIPTION OF THE DRAWING

One embodiment of the present invention will now be more particularly described, by way of example, with reference to the accompanying drawing, the single FIGURE of which is a schematic block diagram representing an array of detector elements and the electronic logic circuits connected to it.

DESCRIPTION OF THE PREFERRED EMBODIMENT

Referring now to the drawing there is shown an array of detector elements, generally indicated 11, which in the drawing is shown as twenty one rows of detector elements. In this embodiment the number of detector rows (N) has been chosen as 21 for simplicity, although it will be appreciated that in practice N might be less than or greater than this. If, for example, the overlap P is chosen as 3 then $N/P=7, P+1=4$, and $N+N/P=28$. Likewise, each row of detector elements has been represented by a horizontal line rather than indicating each individual detector element; in a practical embodiment the number may vary from one to several hundred detector elements in each row. The associated optical scanning system has not been illustrated since this is not different from known optical scanning systems for this purpose except in the relation between the speed at which the polygonal reflector is rotated and the number of detector elements in the array.

The twenty one rows of detector elements 11 are shown grouped as three separate groups of seven rows, although again this is purely for convenience of the explanation and in practice the rows of the detector array would all be equally spaced.

The outputs from the detector elements 11 are fed to an analogue summing circuit, and the output from the summing circuit 12 is passed to an analogue-to-digital converter 13 which converts the analogue sum to digital form and feeds the digital signal to a processor circuit which controls an array of $P+1=4$ groups each of seven stores 15, the four groups being represented by the subscripts 1–4. The individual stores of each group are capable of holding the picture content of an entire line.

The individual rows of detector elements in the first group of the array 11 are indicated by the subscripts a–g: the rows of detector elements in the second group are indicated by the subscripts $a_2$–$g_2$, the same reference letter indicating corresponding rows; and likewise in the third group the rows are indicated by the subscripts $a_3$–$g_3$.

In operation, each part of the picture is scanned three times, this representing the degree of overlap P.

Considering now a scan subsequent to the first in the production of a picture frame, for example the fourth scan, the detector rows $11a_1$ to $11g_1$ of the first group are scanned with picture information being scanned for the first time whilst the rows $11a_2$–$11g_2$ of the second group are scanned with the picture information which in the third scan was scanned across the first group $11a_1$–$11g_1$. Likewise the third group of detectors $11a_3$–$11g_3$ are scanned with the picture information which in the third scan was scanned across the second group of detectors $11a_2$–$11g_2$. During this fourth scan the output signals from the detector elements of the first group $11a_1$–$11g_1$ are fed to the associated analogue summer circuits 12, and then via the analogue-to-digital converter 13 to the first group of stores $15_1$, the contents of the first group of stores $15_1$ being fed out to a first part of the processor circuit $14_1$ which at this time is receiving signals from the second group of detectors $11a_2$–$11g_2$ which is being scanned with the picture information which in the previous scan was scanned across the first group of detectors $11a_1$–$11g_1$. The contents of the second group of stores $15_2$ are at this time being fed via the second part $14_2$ of the processor 14 to the fourth group of stores $15_4$ in addition to the signals from the third group of rows of detectors $11a_3$–$11g_3$, and the contents of the store $15_3$ are being fed out to be converted into television format. In the next scan the processing is similar, with the exception that the contents of the store group $15_2$ are fed into store group $15_3$ together with signals from the third detector groups $11a_3$–$11g_3$, whilst the contents of store group 15₄ are fed out for conversion.

In the embodiment described above there is a triple overlap although it will be appreciated that much greater degrees of overlap can be employed in practical systems using a greater number of rows of detectors than that illustrated in the drawing. Of course, no signal can be displayed until the set number of overlapping scans has taken place. In the above embodiment, therefore, signals from the first and second scans will be incomplete and therefore are not displayed. In general, for a P-fold overlap, the first P−1 scans will not be displayed as they will not have been scanned the requisite number of times.

We claim:

1. An optical scanning device for producing electrical picture-information signals representative of a scene under surveillance, said device comprising:

a detector array having a predetermined number of rows each of at least one detector element and such arranged to product electrical output signals indicative of light incident thereon, optical means arranged to cause a repeated monitoring of the whole of said scene by repeatedly effecting a number of scans during each of which incident light received from a corresponding band of the surveyed scene is scanned across said detector array, the output signals produced by each said rows of the detector array during a said scan representing a respective line of picture information taken from the corresponding band of the surveyed scene, said optical means being so arranged that during each monitoring of the scene successively scanned bands overlap each other in a direction transverse to the direction of scanning by an amount sufficient to cause each said line of picture information to be represented more than once, and signal processing means arranged to receive the said output signals produced by the detector array during each monitoring and to combine together those signals which represent the same line of picture information.

2. An optical scanning device as claimed in claim 1, wherein said signal processing means comprises a plurality of groups of stores each arranged to store the output signals produced by a respective one of the detector-array rows during each scan, and means for summing for each said line of picture information for which output signals have been stored both the stored output signals and the output signals produced during a subsequent scan of the same line of picture.

3. An optical scanning device as claimed in claim 2, wherein the number of stores is at least $N+N/P$ where $N$ is the number of detector rows and $P$ the overlap, said stores being organised into $P+1$ groups and the detector rows being organised into $P$ groups of $N/P$ rows each, each store of each said group of stores other than a first said group being fed via said summing means with the output signals from a respective detector row of an associated said group of rows and with the signals stored in the corresponding store of the group of stores associated with an adjacent said group of rows.

4. An optical scanning device as claimed in claim 2, wherein the said stores are digital stores and each detector row has an associated analogue-to-digital converter.

5. An optical scanning device as claimed in claim 4, wherein each detector row has an associated analogue summing circuit to which the outputs of the said at least one detector element of that row are fed, the output of said analogue summing circuit being fed to said analogue-to-digital converter.

6. An optical scanning device as claimed in claim 3, including a device for converting into a format suitable for television display the signals output from the stores associated with a last said group of detector rows.

* * * * *